US012573854B2

(12) United States Patent
Finn et al.

(10) Patent No.: US 12,573,854 B2
(45) Date of Patent: Mar. 10, 2026

(54) ELECTRIC VEHICLE CHARGING SYSTEM

(71) Applicant: Tritium Holdings Pty Ltd, Murarrie (AU)

(72) Inventors: David Andrew Finn, Brisbane (AU); James McFarlane Kennedy, Brisbane (AU); Calem Timothy Walsh, Brisbane (AU); Michael John Walton, Brisbane (AU); Nicholas Athol Keeling, Brisbane (AU)

(73) Assignee: Tritium Holdings Pty Ltd, Murarrie (AU)

( * ) Notice: Subject to any disclaimer, the term of this patent is extended or adjusted under 35 U.S.C. 154(b) by 58 days.

(21) Appl. No.: 18/037,221

(22) PCT Filed: Dec. 20, 2021

(86) PCT No.: PCT/AU2021/051522
§ 371 (c)(1),
(2) Date: May 16, 2023

(87) PCT Pub. No.: WO2022/126205
PCT Pub. Date: Jun. 23, 2022

(65) Prior Publication Data
US 2023/0411967 A1     Dec. 21, 2023

(30) Foreign Application Priority Data
Dec. 18, 2020     (AU) ............................... 2020904738

(51) Int. Cl.
| | |
|---|---|
| *H02J 3/46* | (2006.01) |
| *B60L 53/51* | (2019.01) |
| *B60L 53/67* | (2019.01) |
| *H01M 10/46* | (2006.01) |

(52) U.S. Cl.
CPC ................ *H02J 3/46* (2013.01); *B60L 53/51* (2019.02); *B60L 53/67* (2019.02); *H01M 10/46* (2013.01);
(Continued)

(58) Field of Classification Search
CPC ......... H02J 3/46; H02J 2310/48; B60L 53/67; B60L 53/11; B60L 53/30; H01M 10/46; Y02T 90/12
(Continued)

(56) References Cited

U.S. PATENT DOCUMENTS

| | | | |
|---|---|---|---|
| 2004/0130292 A1 | 7/2004 | Buchanan et al. | |
| 2011/0043165 A1 | 2/2011 | Kinser et al. | |

(Continued)

FOREIGN PATENT DOCUMENTS

| | | |
|---|---|---|
| WO | 2020/181384 A1 | 9/2020 |

OTHER PUBLICATIONS

International Searching Authority, International Search Report, issued in connection with International Application No. PCT/AU2021/051522, mailed Mar. 30, 2022 (7 pages).

(Continued)

*Primary Examiner* — Rexford N Barnie
*Assistant Examiner* — Terrence R Willoughby
(74) *Attorney, Agent, or Firm* — Polsinelli PC; Gregory P. Durbin

(57) ABSTRACT

An electric vehicle charging system comprising a Direct Current (DC) distributor, a site controller, one or more alternating current (AC)/DC rectifiers connected to the DC distributor and the site controller, and an electric vehicle charger having one or more DC/DC converters connected to the DC distributor and a charge controller in communication with the site controller and each of the one or more DC/DC (Continued)

converters. The one or more AC/DC rectifiers are decoupled from the one or more DC/DC converters.

19 Claims, 4 Drawing Sheets

(52) U.S. Cl.
CPC ....... *B60L 2210/10* (2013.01); *B60L 2210/30* (2013.01); *H01M 2220/20* (2013.01); *H02J 2300/24* (2020.01)

(58) Field of Classification Search
USPC ................................................ 307/9.1–10.1
See application file for complete search history.

(56) References Cited

U.S. PATENT DOCUMENTS

| | | | |
|---|---|---|---|
| 2012/0277927 A1 | 11/2012 | Watkins et al. | |
| 2013/0257146 A1* | 10/2013 | Nojima | B60L 53/22 |
| | | | 307/9.1 |
| 2018/0339595 A1* | 11/2018 | Chang | B60L 55/00 |
| 2019/0081489 A1 | 3/2019 | Gerber et al. | |
| 2020/0001730 A1 | 1/2020 | Gohla-Neudecker et al. | |
| 2020/0366104 A1 | 11/2020 | Stanfield | |
| 2023/0155380 A1* | 5/2023 | Rikiso | H02J 3/00125 |
| | | | 307/9.1 |
| 2023/0322118 A1* | 10/2023 | Valentinetti | B60L 53/53 |
| | | | 320/109 |

OTHER PUBLICATIONS

International Searching Authority, Written Opinion, issued in connection with International Application No. PCT/AU2021/051522, mailed Mar. 30, 2022 (9 pages).
European Patent Office, Supplementary European Search Report, issued for EP Application No. 21904674.5, mailed Apr. 23, 2024.

* cited by examiner

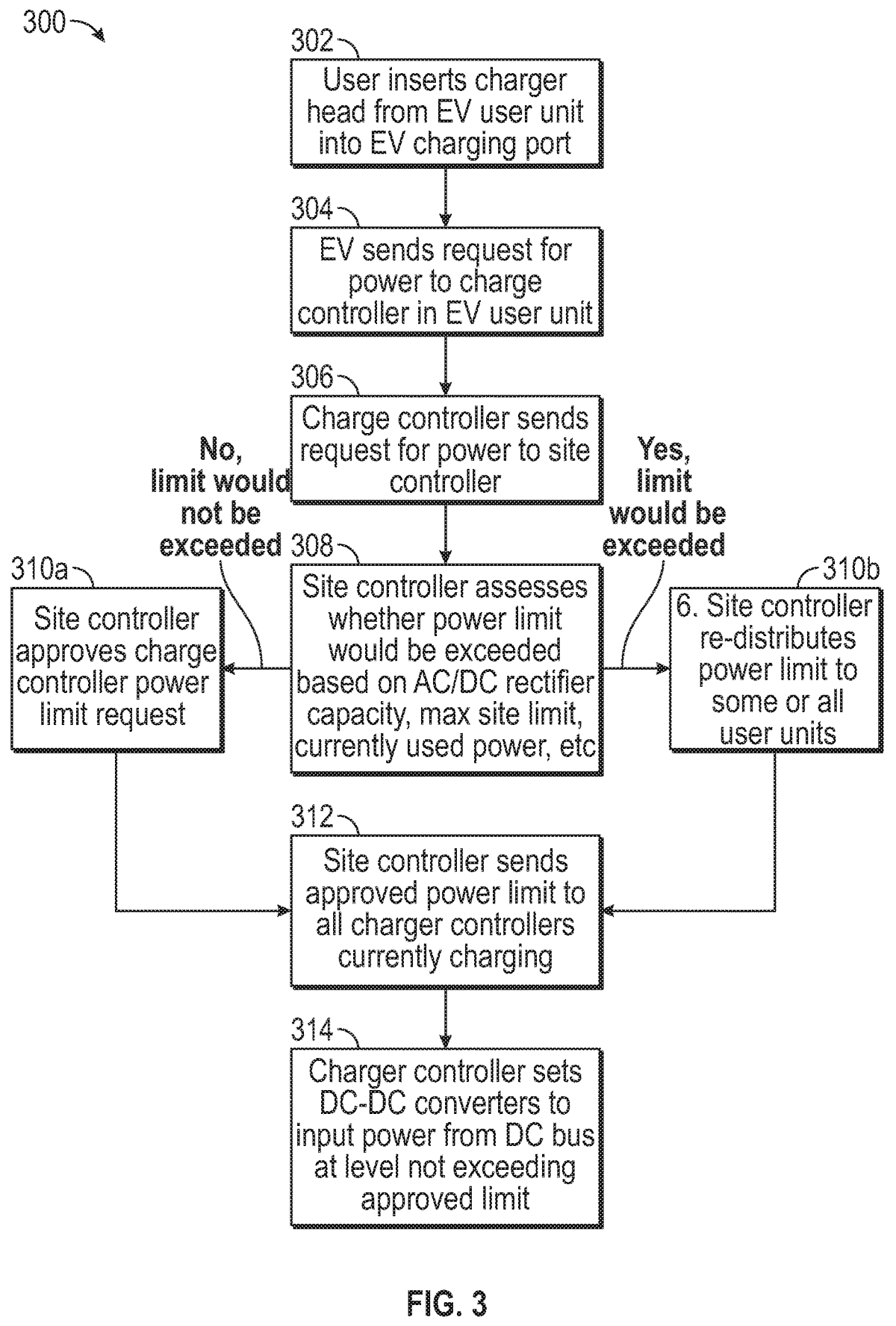

300

302
User inserts charger head from EV user unit into EV charging port

304
EV sends request for power to charge controller in EV user unit

306
Charge controller sends request for power to site controller

No, limit would not be exceeded

Yes, limit would be exceeded

308
Site controller assesses whether power limit would be exceeded based on AC/DC rectifier capacity, max site limit, currently used power, etc 310a
Site controller approves charge controller power limit request 310b
6. Site controller re-distributes power limit to some or all user units 312
Site controller sends approved power limit to all charger controllers currently charging 314
Charger controller sets DC-DC converters to input power from DC bus at level not exceeding approved limit

FIG. 3

ELECTRIC VEHICLE CHARGING SYSTEM

TECHNICAL FIELD

The present invention relates to an electric vehicle charger system. In particular, the present invention relates to an electric vehicle charger system with decoupled AC/DC rectifiers and DC/DC converters to support system scalability and a method of controlling an electric vehicle charging system.

BACKGROUND

Any references to methods, apparatus or documents of the prior art are not to be taken as constituting any evidence or admission that they formed, or form part of the common general knowledge.

Power electronics technology is improving rapidly and is likely to render devices that currently utilise state-of-the-art equipment obsolete within a decade. Electric vehicle (EV) chargers, which utilise power electronics, are not exempt from or immune to these developments. In particular, EV chargers and their installations are exceptionally expensive, rendering EV charger upgrading at the pace of technological growth financially prohibitive for most charge point operators (CPOs; e.g. hotels, shopping centres, etc).

Furthermore, the EV market is continuing to expand because of the momentum away from fossil fuels towards renewable energy sources. Despite market expansion, a major problem continually faced by EV drivers is accessing conveniently located chargers. EV drivers are required to know in advance where EV chargers are located—unlike with petrol stations, EV chargers are not ubiquitous, and are supplied in limited quantity. Should an EV charger fail, or be fully occupied, EV drivers risk being stranded without charge. The likelihood that an EV charging station is already fully utilised by other EV owners will continue to increase into the future, as uptake of EVs increases, if the cost of installing EV chargers remains disproportionately greater than the possible returns for CPOs.

Modular EV charging systems can be designed to support unfixed ratios of AC/DC rectifiers and DC/DC converters, both in terms of numbers of physical units and overall power capability. However, these systems rely on the distribution of power between rectifiers and converters to be facilitated by internal circuitry, internal busbars and internal cabling.

Thus, it is desirable to provide an electric vehicle charging system that, rather than requiring full replacement (when partially broken) or upgrade (when obsolete), is serviceable, upgradeable, and expandable, to account both for rapid technological growth both within the EV charger and EV markets (thus increased demand for chargers).

Furthermore, it is desirable and an object of the present invention to provide an electric vehicle charging system which overcomes or ameliorates the problems described above.

SUMMARY OF INVENTION

In an aspect, the invention provides an electric vehicle charging system comprising:
  a Direct Current (DC) distributor;
  a site controller;
  one or more alternating current (AC)/DC rectifiers connected to the DC distributor and the site controller; and
  an electric vehicle charger having one or more DC/DC converters connected to the DC distributor and a charge controller in communication with the site controller and each of the one or more DC/DC converters;
  wherein the one or more AC/DC rectifiers are decoupled from the one or more DC/DC converters.

Preferably, the DC distributor comprises a DC distribution bus. Preferably, the DC distributor is adapted to receive DC power from one or more AC/DC rectifiers and distribute the DC power among one or more DC/DC converters.

Preferably, the system further comprises one or more electric vehicle chargers housing the one or more DC/DC converters.

Preferably, the one or more AC/DC rectifiers are housed in a first housing and the one or more DC/DC converters are housed in a second housing, wherein the first housing is decoupled and physically separated from the second housing.

Preferably, the system further comprises one or more batteries connected to the DC distributor. Preferably, the one or more batteries are connected to the DC distributor via a DC/DC converter.

Preferably, the system further comprises a solar photovoltaic system connected to the DC distributor and/or the one or more batteries. Preferably, the solar photovoltaic system is connected to the DC distributor via a DC/DC converter.

Preferably, the site controller is adapted to control the distribution of power to the one or more DC/DC converters based on requests for power to power an electric vehicle. Preferably, the site controller is adapted to issue instructions to the charge controller in response to a request for an amount of power from the charge controller to provide power to the one or more DC/DC converters, wherein the charge controller issues instructions to the one or more DC/DC converters to draw an approved amount of power from the DC distributor based on an approved power limit determined by the site controller. Preferably, the approved power limit is calculated by the site controller by determining if granting the request for an amount of power would exceed a power limit of the electric vehicle charging system. Preferably, the power limit is based on a current AC/DC rectifier capacity, a maximum site power limit and/or currently utilised power.

In another aspect, the invention provides a method of controlling an electric vehicle charging system, the method including:
  receiving a request at a site controller of an electric vehicle charging system to provide power to an electric vehicle charger to provide said power to an electric vehicle;
  determining if granting the request would exceed a power limit of the electric vehicle charging system; and
  providing an approved power limit by the site controller to the electric vehicle charger, wherein the electric vehicle charger cannot provide power greater than the approved power limit to the electric vehicle.

Preferably, the method includes the further step of providing power from the electric vehicle charger to the electric vehicle, wherein the provided power is equal to or less than the approved power limit.

Preferably, the method includes providing an electric vehicle charging system as described above.

Preferably, the request includes a request for an amount of power.

Preferably, the method includes the further step of determining that granting the request would exceed the power limit of the electric vehicle charging system and, in response, providing an approved power limit to the electric vehicle charger, wherein the approved power limit is less than the requested amount of power.

Preferably, the method includes the further step of determining that granting the request would not exceed the power limit of the electric vehicle charging system and, in response, providing an approved power limit to the electric vehicle charger, wherein the approved power limit is equal to the requested amount of power.

Preferably, the method includes the further step of determining that granting the request would exceed the power limit of the electric vehicle charging system and, in response, providing an approved power limit to the electric vehicle charger, wherein the approved power limit is equal to the requested amount of power, and providing an adjusted approved power limit to a second electric vehicle charger currently operating on a current approved power limit, wherein the adjusted approved power limit is less than the current approved power limit.

Preferably, the power limit is based on a current AC/DC rectifier capacity, a maximum site power limit and/or currently utilised power.

Preferably, the request is issued by a charge controller of the electric vehicle charger to the site controller.

Preferably, the step of providing an approved power limit by the site controller to the electric vehicle charger, wherein the electric vehicle charger cannot provide power greater than the approved power limit to the electric vehicle comprises providing the approved power limit by the site controller to the charge controller of the electric vehicle charger, wherein the charge controller instructs a DC/DC converter of the electric vehicle charger to request power from a DC distributor in accordance with the approved power limit. Preferably, the step further comprises one or more AC/DC rectifiers providing power to the DC distributor to be distributed to the DC/DC converter of the electric vehicle charger.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 3 is a flow diagram of a method of controlling an electric vehicle charging system according to an embodiment of the present invention.

DETAILED DESCRIPTION OF PREFERRED EMBODIMENTS

Figure 1:
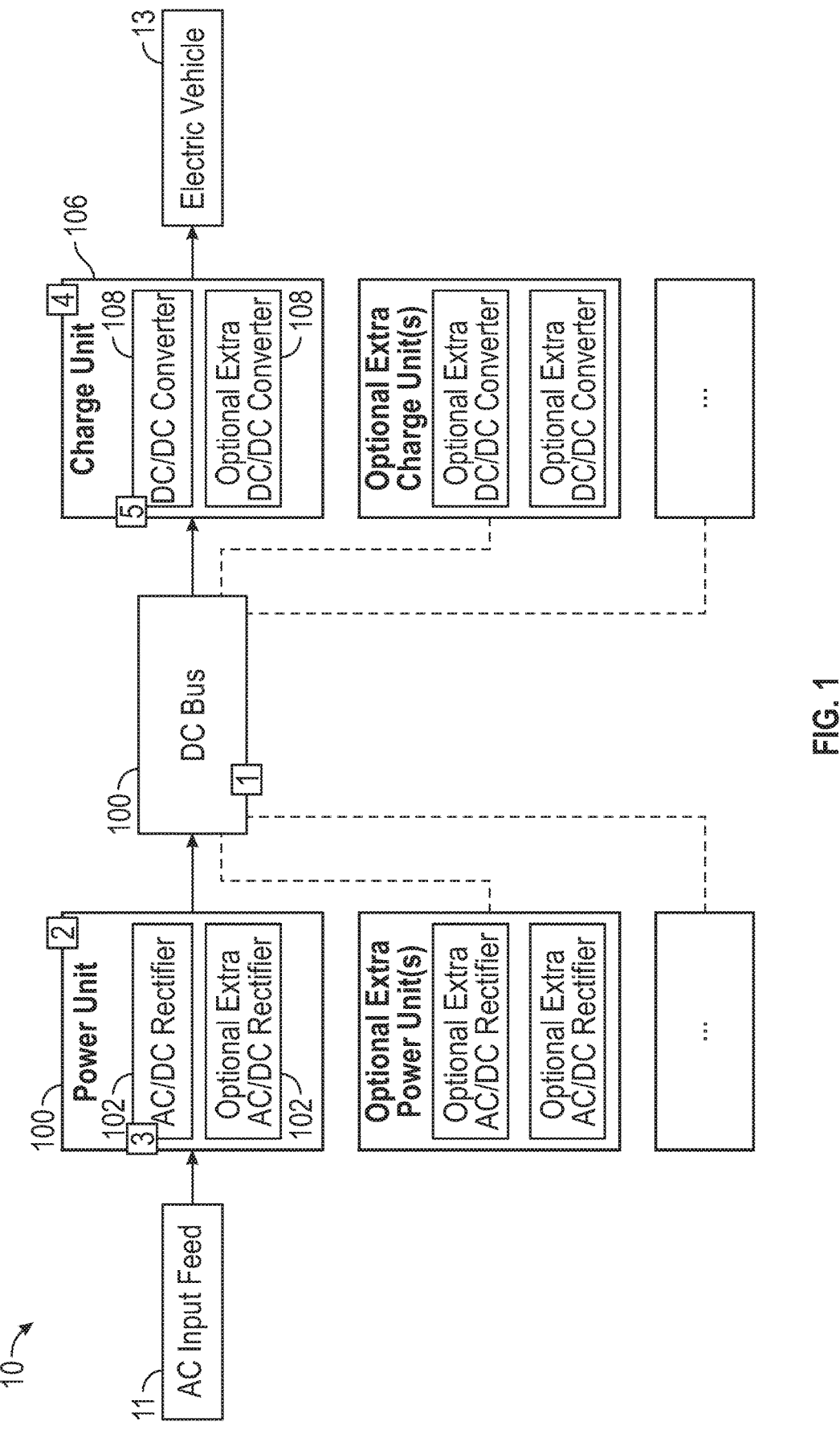
FIG. 1 is a simple schematic of an electric vehicle charging system according to an embodiment of the present invention.
Figure 2:
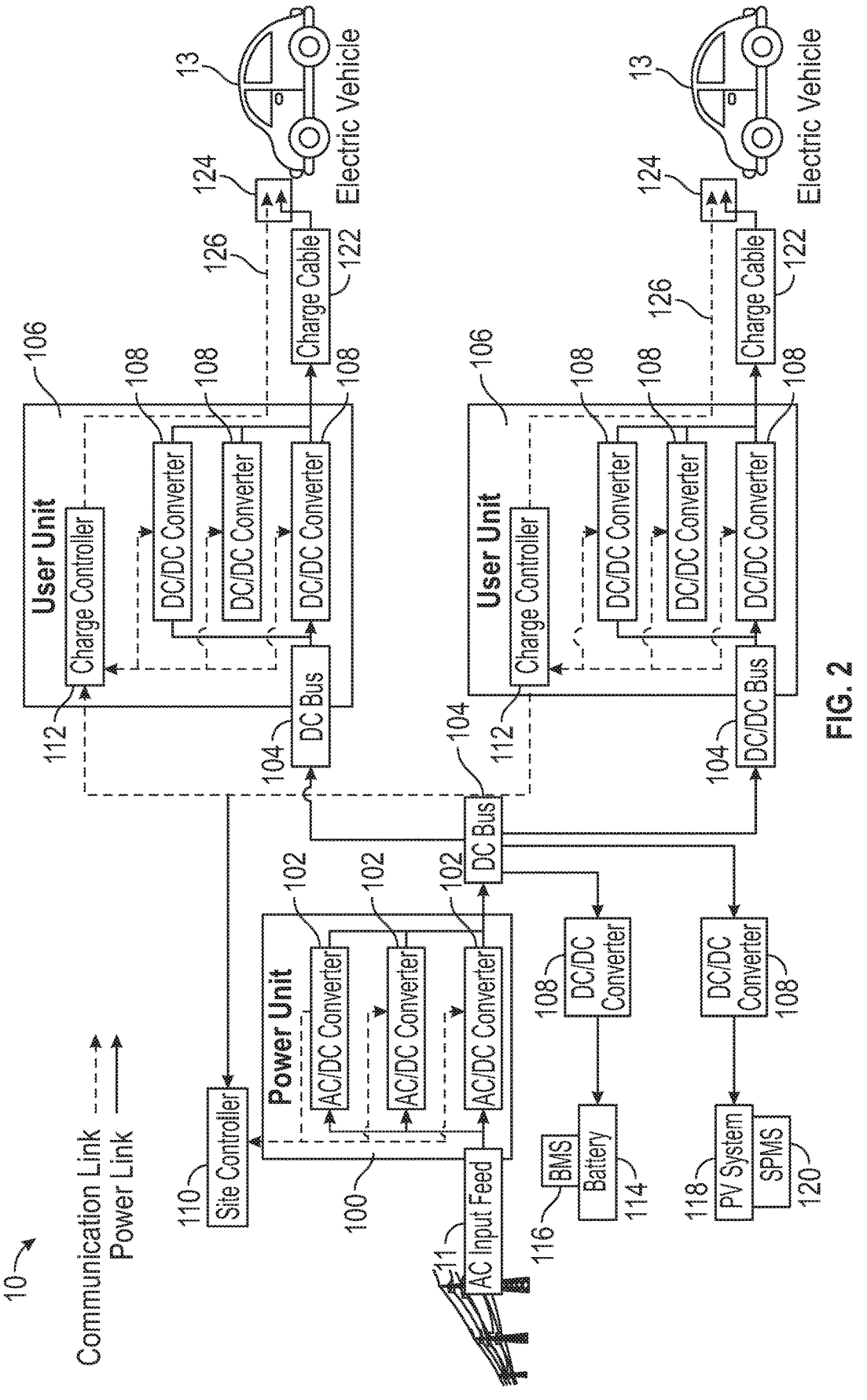
FIG. 2 is more detailed schematic of the electric vehicle charging system of FIG. 1.

FIGS. 1 and 2 illustrate an electric vehicle (EV) charging system 10 according to a preferred embodiment of the present invention.

FIG. 1 shows a simple schematic diagram of the architecture of the EV charging system 10. The EV charging system 10 includes a power unit 100 housing an (AC)/direct current (DC) rectifier 102 having a data interface for a separate device to control the AC/DC rectifier 102 (this is described in more detail below). Each rectifier 102 is connected to a mains power supply 11 to receive power therefrom. It will be readily understood that the number of power units 100 and AC/DC rectifiers 102 can be varied. For example, additional AC/DC rectifiers can be added or AC/DC rectifiers removed to an individual power unit 100. Furthermore, additional power units housing a single AC/DC rectifier or a plurality of AC/DC rectifiers may also be provided.

The rectifiers 102 of the power unit 100 are electrically connected to a DC distributor in the form of a common DC distribution bus 104 via a DC output of the power unit 100.

The common DC distribution bus 104 is connected to a DC input of each of a plurality of EV chargers 106.

Each EV charger 106 contains a DC/DC converter 108 for transforming the DC received from the DC distribution bus 104 into an appropriate voltage and current for a battery of an EV, typically between 200 Vdc and 920 Vdc. For example, one brand of vehicle may require an input voltage of 800V while a second brand of vehicle may require an input voltage of 400V. In effect, the DC distribution bus 104 is adapted to receive DC power from one or more AC/DC rectifiers 102 and distribute the DC power among one or more DC/DC converters 108 as required. The manner that this is achieved will be described in more detail below.

Importantly, the power unit 100 containing the AC/DC rectifiers 102 and the EV charger 106 containing the DC/DC converters 108 are physically decoupled in that the AC/DC rectifiers 102 and the DC/DC converters 108 are located in distinct, physically separated housings that are in electrical communication via the DC distribution bus 104 but are physically separated.

Turning now to FIG. 2, which shows a more detailed schematic of system 10, the EV charging system 10 can be seen to include a site controller 110, in the form of a computing system, and a charge controller 112, also in the form of a computing system, located within each EV charger 106. The charge controller 112 is connected to each DC/DC converter 108 located within a respective EV charger 106.

The site controller 110 is in data communication with each of the charge controllers 112.

The flow of DC power in and out of the DC distribution bus is controlled and regulated by the site controller 110, which is connected to the AC/DC rectifiers 102 of the power unit 100 and the charge controllers 112 of the EV chargers 106.

The functionality of the site controller 110, and the electric vehicle charging system 10 generally will be described in more detail below.

In some embodiments, the EV charger system 10 also includes one or more batteries 114. The batteries 114 are connected to the DC distribution bus 104 through a DC/DC converter 108.

Having one or more batteries 114 connected to the DC distribution bus 104 increases the reliability of DC power injection to the DC distribution bus 104, which is particularly beneficial in an oversubscribed configuration.

The reliability of DC power on an oversubscribed DC distribution bus 104 is improved by the batteries 114 as additional power can be transferred from the batteries 114 into the DC distribution bus 104 when the combined DC power demands of all DC/DC converters 108 conducting EV charging exceeds the combined maximum power injection capability of all AC/DC rectifiers 102 connected to the DC distribution bus 104.

The benefit of injecting additional power into the DC distribution bus 104 in the above circumstance is to maintain the DC power on the DC distribution bus 104 closer to, or in satisfaction of, the maximum input rate of the DC/DC converters 108 in order to improve or preserve EV charging performance despite the AC/DC rectifiers 102 being over-subscribed.

When batteries 114 are not injecting power into the DC distribution bus 104, power can be input into the batteries 114.

In some embodiments, power can be input into the batteries 114 from a separate power source, such as a photovoltaic (PV) system 118 (described further below), to provide solar power to charge the battery 114. The flow of power in and out of the batteries 114, being from and to the DC distribution bus 104, respectively, is managed by a battery management system 116, in the form of a computer system.

As mentioned above, a PV system 118 can be provided in EV charging system 10. The PV system 118 is connected to a DC/DC converter 108 which is in turn connected to the common DC distribution bus 104. The PV system 118 can provide additional power on the DC distribution bus 104 for utilisation by the user units or for storage within the battery 114.

The PV system 118 can be managed by a solar power management system 120, in the form of a computer system.

In some embodiments, the DC/DC converters 108 include an isolation barrier which electrically isolates multiple DC/DC converters 108 housed within a single user unit from each other. This isolation barrier safely allows multiple vehicles to be connected to, and simultaneously charged with, a single EV user unit having multiple charger heads or charger cables. Furthermore, the isolation barrier prevents the multiple vehicles being simultaneously charged from being connected together, either accidentally or by way of an electrical fault. In the case of a fault, the isolation barrier advantageously prevents massive fault currents between the multiple car batteries.

Figure 4:
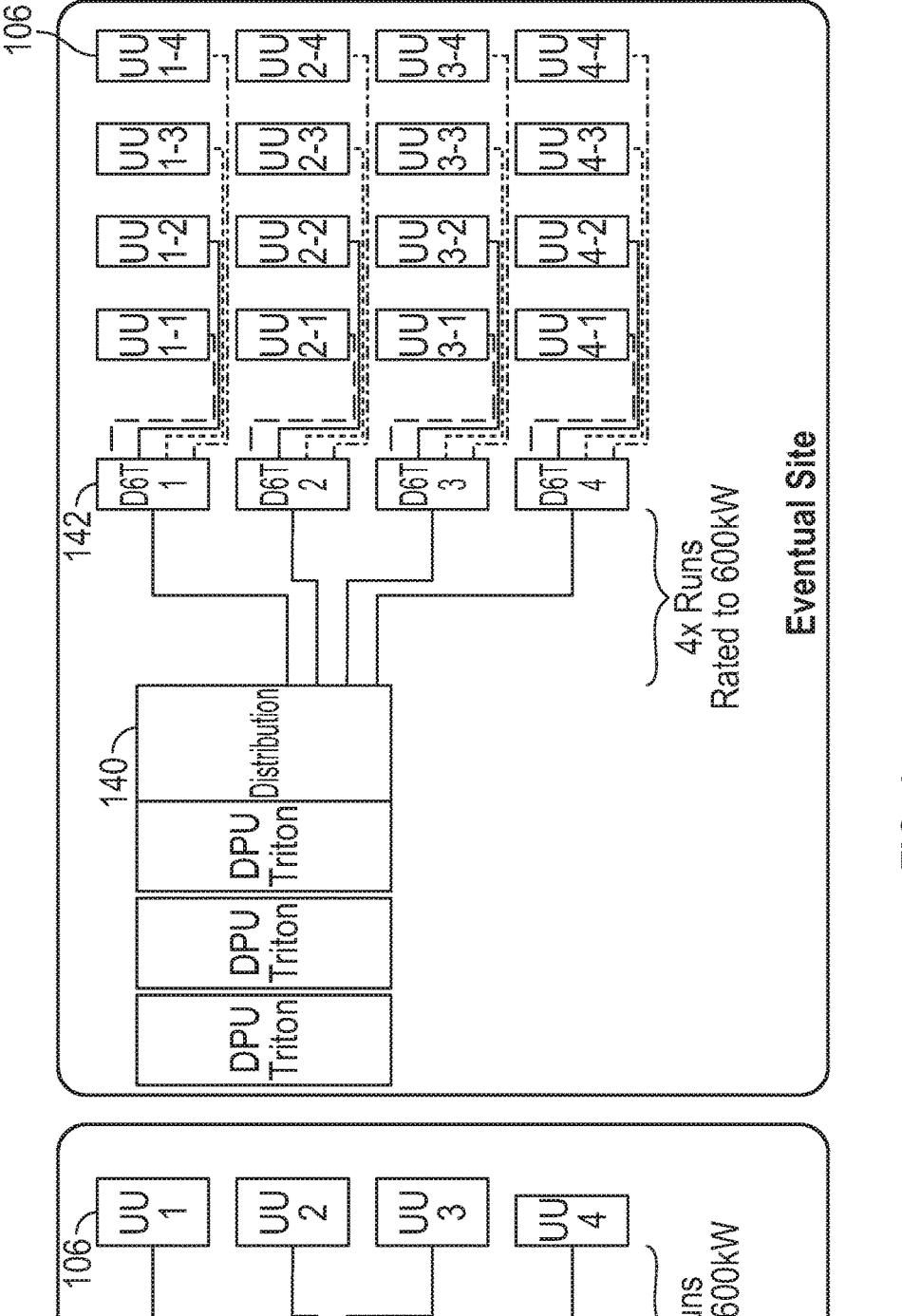
FIG. 4 illustrates a smart switch configuration for use with embodiments of the present invention.

With reference to FIG. 4, in some further embodiments, the EV charging system 10 provides a connection hub 140 in the form of a distribution panel that forms the start of the connection of multiple legs of the DC distribution bus. The connection hub 140 need not be collocated with the site controller.

Multiple layers of smart switches 142 may be provided as the DC distribution bus continues to branch out.

The connection hub 140 includes several smart switches 142 which include both hardware and software.

Each smart switch 142 controls one or more EV chargers 106 connected thereto.

Each smart switch 142 utilises a method (described below) to recognise the EV charger/s 106 that are connected thereto. The smart switch 142 then keeps a list of that group (e.g. each charger's serial numbers).

Each smart switch 142 can then report the list of EV chargers 106 it is connected to, to the site controller.

The site controller then knows the topology of the entire site. By knowing the topology, the site controller can perform power management on that group of EV chargers 106 to make sure each smart switch 142, which is power limited by hardware (e.g. a fuse) is not overloaded.

Additionally, the site controller can provide users with informative reporting based on topological information from the smart switches 142. This informative reporting can include reporting about temperature, DC/DC availability, and charger availability.

The methods the smart switch can use to enumerate its line/group of chargers is by:

1. Using a communications protocol only available to the line/group of chargers. This is not ideal as all chargers must be physically wired to a specific communications repeater;

2. Using a communications protocol available to all chargers on the site, and a standard (not "smart") signaling protocol available only to that line/group of chargers; or 3. Using a communications protocol available to all chargers on the site, and a structured "bring-up"/commissioning stage requiring some human intervention, where groups/lines of chargers are powered up one at a time.

In summary of the preceding description, embodiments of the invention provide an electric vehicle charging system 10 having one or more power units 100, each containing one or more AC/DC rectifiers 102, are each connected at a DC output of the power unit 100 with one or more cables, or a similarly suitable electrically conductive connector, to a "convergence point". The convergence point, which may take the form of a busbar, or a similarly suitable electrically conductive connector which permits the convergence of other connectors, is the DC distribution bus 104.

One or more EV chargers 106, each containing one or more DC/DC converters 108, are each connected at a DC input end of the EV charger 106 with one or more cables, or a similarly suitable electrically conductive connector, to the DC distribution bus 104.

Each EV charger 106 includes one or more charge cables 122 and a respective charger head 124 for connecting the EV charger 106 to one or more EVs 13.

For each charger head 124 provided by each EV charger 106, one or more surfaces of the charger head 124, which on one side/end are configured to connect to one or more DC input receptors of an EV 13, are connected on the other side/end to the DC output of the EV charger 106 via the charge cable 122 within a large cable enclosing smaller cables, either directly or indirectly.

The site controller 110 is connected separately to each power unit 100 and EV charger 106 via a connector or series of connectors capable of data transfer, which may include, but should not be limited to, cables suitable for data transfer and traces on a circuit board.

For each EV charger 106, the data connection from the site controller 110 is connected to each charge controller 112 either directly, with the data connection from the site controller 110 physically connecting to each charge controller 112, or indirectly, with the data connection from the site controller 110 being connected to each charge controller 112 through a connection internal to the EV charger 106, which may take the form of one or more traces on a circuit board.

For each charger head 124 provided by each EV charger 106, one or more surfaces of the charger head 124, which on one side are configured to connect to one or more data receptors of an EV, are connected on the other side/end to the charge controller 112 through a data cable 126 within the aforementioned large cable enclosing smaller cables, either directly or indirectly.

For each charger head 124 provided by each EV charger 106, the data cables 126 are connected to the charge controller 112 either directly (as shown), with the data cables 126 from the charger head 124 physically connecting to the charge controller 112, or indirectly, with the data cables being connected to the charge controller 112 through an internal connection, which may take the form of one or more traces on an internal circuit board.

For each DC/DC converter 108 within each EV charger 106, the data interface of the DC/DC converter 108 is connected to the charge controller 112 with a connector or series of connectors suitable for data transfer, which may take the form of one or more traces on a circuit board.

As described above, in use, the flow of DC power in and out of the DC distribution bus 104 is regulated by the site controller 110 which is connected to the AC/DC rectifiers 102 of the power units 100 and the charger controllers 112 of the EV chargers 106.

With reference now to FIGS. 2 and 3, a method 300 of controlling an electric vehicle charging system is described with reference FIG. 2 for illustrative purposes.

At step 302 of method 300, when a user wishes to charge their EV 13, the user inserts a charger head 124 of the EV charger 106 into the EV 13, thereby establishing a power connection with the EV charger 106 output circuit and a data connection with the charge controller 112.

In response to the establishment of the above connections, at step 304, the EV 13 periodically messages the charge controller 112 over the data connection with a request for power and provides the charge controller 112 with the power requirements of the EV 13 in order for the appropriate power to be delivered. In particular, the EV 13 periodically provides data relating to the appropriate voltage level for charging the EV 13, the maximum kW and/or current charging rate supported by the EV 13, and the existing charge on the EV 13 battery, expressed in absolute terms and/or as a percentage of the maximum charge.

Upon receipt of the information above, at step 306 of FIG. 3, the charge controller 112 periodically sends an electronic request over the data connection to the site controller 110 and requests permission from the site controller 110 for its EV charger 106 to draw power from the DC distribution bus 104.

In making the request to the site controller 110, the charge controller 112 provides an ID identifying the type of request, the amount of power in kW which the charge controller 112 has determined is the ideal supply to the EV (the assessment being inclusive of the available power input capability of the DC/DC converters with the connected EV charger 106), and the amount of power in kW the charge controller 112 is currently supplying to the EV. This last piece of data is important for the site controller 110 to be able to manage requests from multiple charge controllers 112.

In response to the request for power from the charge controller 112, the site controller 110, at step 308, prepares a response to the charge controller 112 through an assessment inclusive of the amount of power requested from the charger controller 112, DC distribution bus 102 hardware limitations (e.g. cable sizes, present fusing/protection devices), temperature of one or more components, time requested to complete charge by EV user, amount of money paid by EV user, the detected possibility of faults across the system, the combined maximum site power setting, and the power being drawn by all presently charging EVs.

The logical process of the site controller 110 for determining whether permission for power draw will be granted, and how much power can be drawn by an EV Charger 106 where permission is granted, is inclusive of the maximum DC power which can be injected by the pool of AC/DC rectifiers 102 into the DC distribution bus 104, the maximum site power setting, the amount of power requested by the connected EV, and the power draw from presently charging EVs. It should be noted that, for all EV Chargers charging an EV at any one time, the site controller 110 periodically (at least once per second) updates the charge controller 112 of each EV charger 106 with how much power is permitted to be drawn at that moment, effectively capping the maximum power that can be drawn by any individual EV charger 106.

At step 310a, if the assessment conducted by the site controller 110 determines that the amount of power requested by the charge controller 112 would not exceed a limit, for example a physical limit such as the combined maximum power injection capability into the DC distribution bus 104 of all AC/DC rectifiers 102, or an arbitrary limit such as a setting, the site controller 110 sends a response to the charge controller 112 over the data connection at step 312. The response includes an ID identifying the request and an approved power limit comprising a power limit amount which is equal to the amount of power requested by the charge controller 112.

Alternatively, at step 310b, if the assessment conducted by the site controller 110 determines that the amount of power requested by the charge controller 112 would exceed a limit, for example a physical limit such as the combined maximum power injection capability into the DC distribution bus 104 of all AC/DC rectifiers 102, or an arbitrary limit such as a setting, the site controller 110 calculates a power limit amount to at least partially accommodate the request from the charge controller 112 while also preventing the limit from being exceeded. The site controller 110 then sends a response to the charge controller 112 over the data connection at step 312. The response includes an ID identifying the request and an approved power limit comprising a power limit amount which is less than the amount of power requested by the charge controller 112.

The site controller 110 may also issue instructions with adjusted lower power amount as a response to other charge controller 112 requests for power which pertain to the charging of different EVs. In effect, this achieves a balance, or weighted balance, between all active EV charging operations with the given site limits.

Additionally, in some embodiments, the site controller 110 sends a power limit amount to the charge controller 112 equal to the amount of power requested by the charge controller 112 despite granting of the requested power amount causing the limit to be exceeded, if the charging of the EV is determined by the site controller 110 to be a priority. The site controller 110 then calculates adjusted power amounts, which are lower power amounts, and issues instructions to the other charge controllers 112 including these adjusted lower power amounts which pertain to the charging of different EVs that are not the prioritised EV.

In response to the response from the site controller 110, at step 314, the charge controller 112 messages one or more DC/DC converters 108 in the EV charger 106 over the data connections to input DC power from the DC distribution bus 104 up to the approved power limit provided to the charge controller 112 by the site controller 110. As a result, an appropriate amount of DC power is injected into the DC distribution bus 104 from the AC/DC rectifiers 102 in the power units 100 as a physical reaction to the input from the DC/DC converters 108 in the EV charger 106.

DC power then passes from the DC/DC converters 108 into the output circuit (not shown) of the EV charger 106, and from the output circuit into the EV via the charge cable 122 and the charger head 124.

Embodiments of the invention provides for a DC distribution bus with one or more Power Units attached which contain one or more AC/DC rectifiers, and with one or more EV chargers attached which contain one or more DC/DC Converters. Power Units inject DC power into the DC distribution bus, and DC power is input from the DC distribution bus into EV chargers. The DC distribution bus is a central connection point and thus the DC power injected into the DC distribution bus from multiple AC/DC rectifiers is pooled together. It is envisioned that all of the DC power injected into the DC distribution bus could be drawn by a single or multiple DC/DC converter attached to the DC distribution bus via an EV charger if the converter were equipped with sufficient power input capability.

As mentioned above, modular EV charging systems can be designed to support an unfixed ratio between attached AC/DC rectifiers and DC/DC converters (both in terms of numbers of physical units and comparative overall power capability). However, in embodiments of the present invention, the power transfer between rectifiers and converters is not predominantly carried through an internal circuit boards, backplanes, busbars, or internal cabling, as per a modular EV charger system, but one or more connections external to an EV charger.

In view of the above, two features of embodiments of the present invention are enabled by the permitted unfixed ratio between AC/DC rectifiers and DC/DC Converters, the pooling of AC/DC rectifier power injectability, and the supervision by the site controller.

The first of these features is AC/DC rectifier redundancy, a feature which is available when the combined maximum power injection capability of all AC/DC rectifiers attached to the DC distribution bus exceeds the combined maximum power input of all DC/DC converters also attached to the DC distribution bus. If one or more AC/DC rectifier units becomes non-operational, yet the combined maximum power injection capability of all AC/DC rectifiers remains greater than or equal to the combined maximum power input of all DC/DC converters, then DC charging performance through any of the DC/DC converters attached to the DC distribution bus would be unaffected by the non-operability. An external, as opposed to internal, connection between AC/DC Rectifiers and DC/DC converters facilitates rectifier injected power redundancy without the requirement of large modular EV charging units containing redundant rectifiers. Moreover, an external connection allows for the non-wastage of redundant rectifiers across different chargers (e.g. when all rectifiers fail within one modular charging unit where other chargers contain working reductant rectifiers).

The second of these features is DC/DC Converter oversubscription, a feature which, by contrast, is available when the combined maximum power input capability of all DC/DC converters attached to DC distribution bus exceeds the combined maximum power injection capability of all AC/DC rectifiers also attached to the DC distribution bus. If the combined DC power demanded by DC/DC converters through the process of EV charging is equal to or less than the combined maximum power injection capability of all AC/DC rectifiers attached to the DC distribution bus, DC charging through any of the DC/DC Converter attached to the DC distribution bus can be performed at the convertors' maximum rate.

However, if the combined DC power demanded by DC/DC converters through the process of EV charging is greater than the combined maximum power injection capability of all AC/DC rectifiers attached to the DC distribution bus, the DC power available on the DC distribution bus is rationed, either in equal proportions or in accordance with some other formulation per SU programming, between the DC/DC Converters on the Bus which are demanding power for EV charging. An external, as opposed to internal, connection between rectifiers and convertors enables (oversubscribed) fast simultaneous charging for few EVs and slow simultaneous charging for many EVs without the requirement of bulky modular EV charging units that provide large numbers of EV charging heads.

Embodiments of the present invention provide an EV charging system that is both expandable and cost-effective through the separation of AC/DC rectifiers and DC/DC converters. As a result of the separation, cost savings can be achieved in the rectification stage as rectification need only occur once, rather than in each individual charger having its own rectifier. This reduces the upfront costs and future expenditure in several ways. The first type of optimisation is the reduction in capital investment required to establish a bank/farm of several EV charging heads. The reduction in cost occurs as fewer AC/DC Rectifiers are required—one or more AC/DC Rectifiers can be used to rectify power for multiple DC/DC Converters.

Embodiments of the invention also allow CPOs to expand their charging capabilities (in terms of power output, and number of charging heads) over time, by fully utilising the infrastructure as originally installed. For example, where a CPO installs a small number of EV charging heads, even as few as one, a large capital investment is required to install the EV charging system in the form of at least one AC/DC Rectifier and two DC/DC Converters, to supply two EV charging heads and charge two electric vehicles. If the CPO wishes to expand their system, as the uptake of EVs amongst consumers increases, the cost of expansion is limited to installing further DC/DC Converters and EV charging heads. Once the AC/DC Rectifier exists, it effectively creates a DC power grid from which any number of DC/DC Converters and EV charging heads can be attached.

Furthermore, investment in EV chargers can be optimised using embodiments of the present invention where the DC/DC Converters can be "oversubscribed". Oversubscription of available power occurs where there is more charger power "available", through several EV charger heads, than can be provided at any given time. A charging system that can take 350 kW from the grid but supplies 6×100 kW EV charging heads, is an example of an oversubscribed system. The benefit of oversubscription is that the owner of the charger can maximise the use of all parts of the charger.

The inventors have found that oversubscription is only possible through decoupling the AC/DC Rectifier, which converts AC/DC grid energy into DC, from the DC/DC Converters, that transform the DC voltage to be compatible with different electric vehicle batteries. The greatest benefits from oversubscription have been found to be achieved where AC/DC Rectifiers and DC/DC Converters are physically decoupled into separate units (as opposed to the Rectifiers and Converters being separated into modules within one charging unit). Oversubscription through separate units achieves two main goals. It firstly eliminates the requirement for monolithic charging structures with numerous charging heads that extend from the one unit (which would inherently limit the number of possible chargers per unit). An AC/DC Rectifier of any size can be placed away from the location where cars are parked, which enables the charging units that EV drivers interact with compact, containing only the DC/DC Converter and the HMI (and other associated technology).

While the AC/DC rectifiers, power units, DC/DC converters and EV chargers of the embodiments of the invention are shown as directly connected to the DC distribution bus, it should be appreciated that these devices may be indirectly connected to the DC distribution bus by way of connection through one or more other devices, which may provide limitations on the amount of power able to be drawn and/or provide additional safety features.

In compliance with the statute, the invention has been described in language more or less specific to structural or methodical features. The term "comprises" and its variations, such as "comprising" and "comprised of" is used throughout in an inclusive sense and not to the exclusion of any additional features.

It is to be understood that the invention is not limited to specific features shown or described since the means herein described comprises preferred forms of putting the invention into effect.

The invention is, therefore, claimed in any of its forms or modifications within the proper scope of the appended claims appropriately interpreted by those skilled in the art.

The invention claimed is:

1. An electric vehicle charging system comprising:
a Direct Current (DC) distributor;
a site controller;
    a power unit having a plurality of alternating current (AC)/DC rectifiers, wherein each AC/DC rectifier is connected to the DC distributor and the site controller;
    a first electric vehicle charger having one or more DC/DC converters connected to the DC distributor and a first charge controller in communication with the site controller and each of the one or more DC/DC converters of the first electric vehicle charger; and
    a second electric vehicle charger having one or more DC/DC converters connected to the DC distributor and a second charge controller in communication with the site controller and each of the one or more DC/DC converters of the second electric vehicle charger;
        wherein the one or more AC/DC rectifiers are decoupled from the one or more DC/DC converters.

2. An electric vehicle charging system according to claim 1, wherein the DC distributor is adapted to receive DC power from one or more AC/DC rectifiers and distribute the DC power among one or more DC/DC converters.

3. An electric vehicle charging system according to claim 1, wherein the system further comprises one or more electric vehicle chargers housing the one or more DC/DC converters.

4. An electric vehicle charging system according to claim 1, wherein the one or more AC/DC rectifiers are housed in a first housing and the one or more DC/DC converters are housed in a second housing, wherein the first housing is decoupled and physically separated from the second housing.

5. An electric vehicle charging system according to claim 1, wherein the system further comprises one or more batteries connected to the DC distributor.

6. An electric vehicle charging system according to claim 5, wherein the system further comprises a solar photovoltaic system connected to the DC distributor and/or the one or more batteries.

7. An electric vehicle charging system according to claim 1, wherein the site controller is adapted to control the distribution of power to the one or more DC/DC converters based on requests for power to power an electric vehicle.

8. An electric vehicle charging system according to claim 1, wherein the site controller is adapted to issue instructions to the charge controller in response to a request for an amount of power from the charge controller to provide power to the one or more DC/DC converters, wherein the charge controller issues instructions to the one or more DC/DC converters to draw an approved amount of power from the DC distributor based on an approved power limit determined by the site controller.

9. An electric vehicle charging system according to claim 8, wherein the approved power limit is calculated by the site controller by determining if granting the request for an amount of power would exceed a power limit of the electric vehicle charging system.

10. An electric vehicle charging system according to claim 8 the power limit is based on a current AC/DC rectifier capacity, a maximum site power limit and/or currently utilized power.

11. A method of controlling an electric vehicle charging system, the method including:
    providing a first electric vehicle charger having one or more DC/DC converters connected to a DC distributor and a first charge controller in communication with a site controller and each of the one or more DC/DC converters of the first electric vehicle charger; and
    providing a second electric vehicle charger having one or more DC/DC converters connected to the DC distributor and a second charge controller in communication with the site controller and each of the one or more DC/DC converters of the second electric vehicle charger;
    receiving a request at a site controller of an electric vehicle charging system to provide power to either the first electric vehicle charger or the second electric vehicle charger to provide said power to an electric vehicle;
    determining if granting the request would exceed a power limit of the electric vehicle charging system; and
    providing an approved power limit by the site controller to the first electric vehicle charger or the second electric vehicle charger that made the request, wherein the electric vehicle charger cannot provide power greater than the approved power limit to the electric vehicle, wherein a plurality of AC/DC rectifiers connected to the site controller provide the power according to the approved power limit to the DC distributor to be distributed to the DC/DC converter of the first electric vehicle charger or the second electric vehicle charger that made the request.

12. A method of controlling an electric vehicle charging system according to claim 11, wherein the method includes the further step of providing power from the electric vehicle charger to the electric vehicle, wherein the provided power is equal to or less than the approved power limit.

13. A method of controlling an electric vehicle charging system according to claim 11, wherein the request includes a request for an amount of power.

14. A method of controlling an electric vehicle charging system according to claim 11, wherein the method includes the further step of determining that granting the request would exceed the power limit of the electric vehicle charging system and, in response, providing an approved power limit to the electric vehicle charger, wherein the approved power limit is less than the requested amount of power.

15. A method of controlling an electric vehicle charging system according to claim 11, wherein the method includes the further step of determining that granting the request would not exceed the power limit of the electric vehicle charging system and, in response, providing an approved power limit to the electric vehicle charger, wherein the approved power limit is equal to the requested amount of power.

16. A method of controlling an electric vehicle charging system according to claim 11, wherein the method includes the further step of determining that granting the request would exceed the power limit of the electric vehicle charging system and, in response, providing an approved power limit to the electric vehicle charger, wherein the approved power limit is equal to the requested amount of power, and providing an adjusted approved power limit to a second electric vehicle charger currently operating on a current approved power limit, wherein the adjusted approved power limit is less than the current approved power limit.

17. A method of controlling an electric vehicle charging system according to claim 11, wherein the approved power limit is based on a current AC/DC rectifier capacity, a maximum site power limit and/or currently utilized power.

18. A method of controlling an electric vehicle charging system according to claim 11, wherein the request is issued by a charge controller of the electric vehicle charger to the site controller.

19. A method of controlling an electric vehicle charging system according to claim 18, wherein the step of providing the approved power limit by the site controller to the electric vehicle charger, wherein the electric vehicle charger cannot provide power greater than the approved power limit to the electric vehicle comprises providing the approved power limit by the site controller to the charge controller of the electric vehicle charger, wherein the charge controller instructs a DC/DC converter of the electric vehicle charger to request power from a DC distributor in accordance with the approved power limit.

* * * * *